United States Patent
Rodkey et al.

(10) Patent No.: US 7,624,171 B1
(45) Date of Patent: Nov. 24, 2009

(54) METHOD FOR DIGITALLY NOTIFYING CUSTOMERS OF A UTILITY

(75) Inventors: Ryan Scott Rodkey, Sugar Land, TX (US); John Frank Rodkey, Missouri City, TX (US); David Lynn Hickey, Rosharon, TX (US); Darren Lynn Ross, Sugar Land, TX (US); Ronald Frank Ramsey, St. Petersburg, FL (US)

(73) Assignee: Techradium, Inc., Sugar Land, TX (US)

( * ) Notice: Subject to any disclaimer, the term of this patent is extended or adjusted under 35 U.S.C. 154(b) by 231 days.

(21) Appl. No.: 11/960,373

(22) Filed: Dec. 19, 2007

Related U.S. Application Data

(63) Continuation-in-part of application No. 11/522,723, filed on Sep. 18, 2006, which is a continuation-in-part of application No. 11/117,594, filed on Apr. 28, 2005, now Pat. No. 7,130,389.

(51) Int. Cl.
G06F 15/16 (2006.01)
H04M 1/64 (2006.01)

(52) U.S. Cl. ............... 709/223; 709/224; 709/231; 707/102; 379/88.12

(58) Field of Classification Search ........... 709/203, 709/224, 228, 231; 707/10, 102; 379/88.12
See application file for complete search history.

(56) References Cited

U.S. PATENT DOCUMENTS

| | | |
|---|---|---|
| 6,442,241 B1 | 8/2002 | Tsumpes |
| 6,463,462 B1 | 10/2002 | Smith |
| 6,496,568 B1 | 12/2002 | Nelson |
| 6,643,355 B1 | 11/2003 | Tsumpes |
| 6,678,358 B2 | 1/2004 | Langsenkamp |
| 6,683,870 B1 | 1/2004 | Archer |
| 6,697,477 B2 | 2/2004 | Fleischer |
| 6,816,878 B1 | 11/2004 | Zimmers et al. |
| 6,842,772 B1 | 1/2005 | Delaney et al. |
| 6,871,214 B2 | 3/2005 | Parsons |
| 6,912,691 B1 * | 6/2005 | Dodrill et al. ............... 715/234 |
| 6,931,415 B2 | 8/2005 | Nagahara |
| 6,970,535 B2 | 11/2005 | Gregory et al. |
| 6,973,166 B1 | 12/2005 | Tsumpes |
| 6,999,562 B2 | 2/2006 | Winick |
| 6,999,565 B1 | 2/2006 | Delaney et al. |
| 7,042,350 B2 | 5/2006 | Patrick |
| 7,069,271 B1 * | 6/2006 | Fadel et al. ................. 707/102 |
| 7,069,303 B2 | 6/2006 | Sikora et al. |
| 7,130,389 B1 * | 10/2006 | Rodkey et al. ........... 379/88.12 |
| 7,130,807 B1 * | 10/2006 | Mikurak ........................ 705/7 |
| 7,184,521 B2 | 2/2007 | Sikora et al. |
| 7,353,256 B2 | 4/2008 | Delaney et al. |

(Continued)

*Primary Examiner*—Khanh Q Dinh
(74) *Attorney, Agent, or Firm*—Buskop Law Group PC; Wendy Buskop

(57) ABSTRACT

A method for digitally notifying customers of a utility. The method includes receiving real time digital user data from a utility using an application programming interface in communication with a processor and a network, and storing the real time digital user data in a dynamic information database in communication with the processor. At least one message is transmit from the utility through the application programming interface to a first group of user contact devices before transmitting the message to a second group of user contact devices. Response information is received from each user contact device.

19 Claims, 8 Drawing Sheets

U.S. PATENT DOCUMENTS

| | | |
|---|---|---|
| 7,401,147 B2 | 7/2008 | Sikora et al. |
| 7,409,428 B1 | 8/2008 | Brabec et al. |
| 2002/0032020 A1 | 3/2002 | Brown |
| 2002/0159570 A1 | 10/2002 | Langsenkamp |
| 2005/0013417 A1 | 1/2005 | Zimmers et al. |
| 2005/0242944 A1 | 11/2005 | Bankert |
| 2005/0272368 A1 | 12/2005 | Langsenkamp |
| 2005/0272412 A1 | 12/2005 | Langsenkamp |
| 2006/0059253 A1* | 3/2006 | Goodman et al. ............ 709/223 |
| 2007/0096894 A1 | 5/2007 | Lemmon |
| 2008/0143548 A1 | 6/2008 | Grimmelmann et al. |
| 2008/0162655 A1* | 7/2008 | Khedouri et al. ............ 709/206 |
| 2009/0077045 A1 | 3/2009 | Kirchmeier et al. |
| 2009/0131088 A1 | 5/2009 | Kirchmeier et al. |
| 2009/0135008 A1 | 5/2009 | Kirchmeier et al. |
| 2009/0156240 A1 | 6/2009 | Kirchmeier et al. |

* cited by examiner

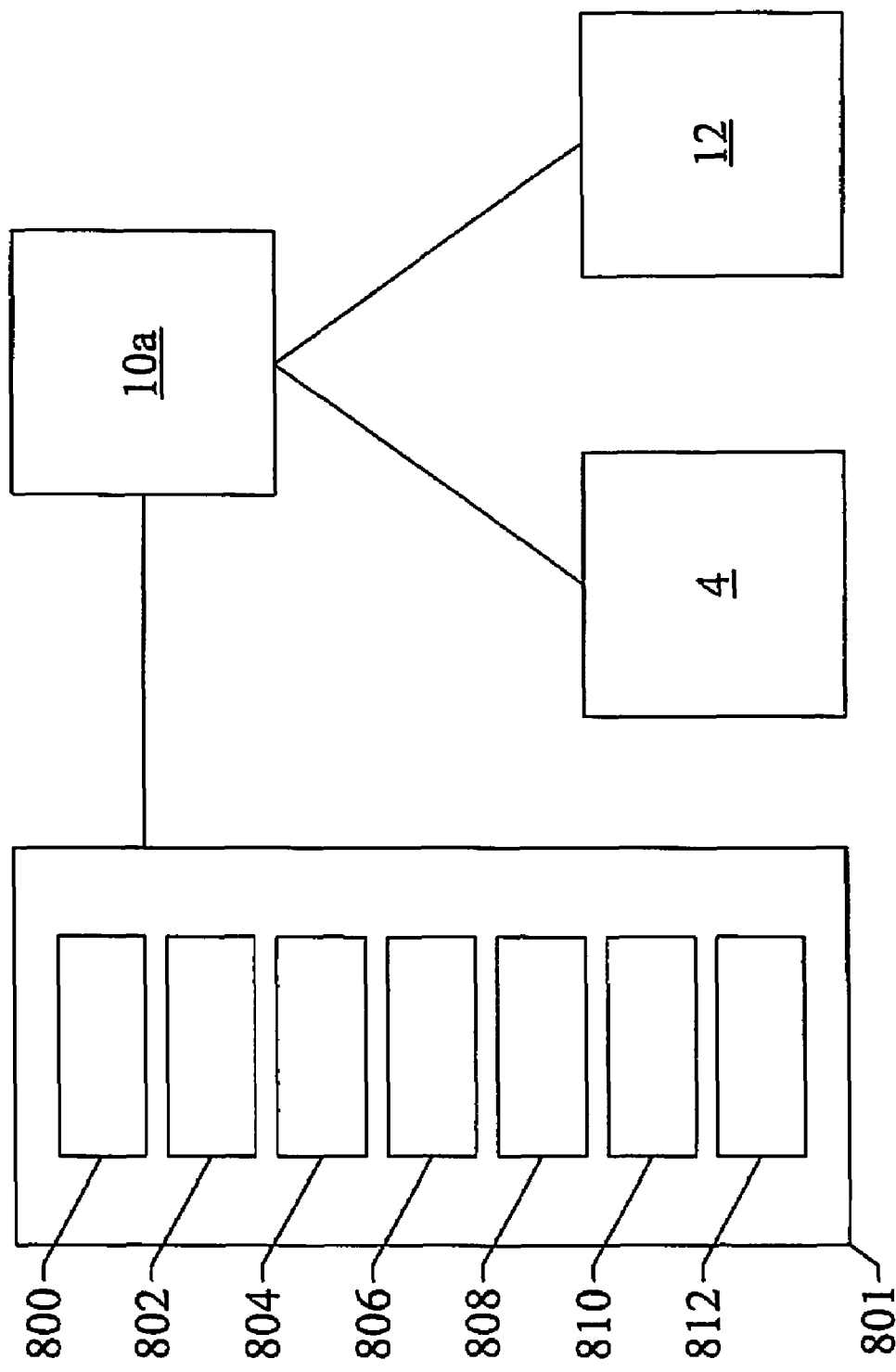

METHOD FOR DIGITALLY NOTIFYING CUSTOMERS OF A UTILITY

CROSS REFERENCE TO RELATED APPLICATIONS

The present patent application is a continuation-in-part application which claims the benefit, under 35 USC § 120, of prior non-provisional application Ser. No. 11/522,723, filed Sep. 18, 2006, which claims the benefit of application Ser. No. 11/117,594, filed Apr. 28, 2005, now U.S. Pat. No. 7,130,389.

FIELD

The present embodiments relate generally to the creation and delivery of messages, to the routing, and to the verification and collection of responses to the messages. The present method is universally applicable to, and independent of, the type of messaging system and device selected by the message recipients.

BACKGROUND

There exists a need for a method for efficiently and accurately transmitting messages to a user of a utility.

A need exists for a method for automating the delivery of messages and collection of message responses implemented through messaging devices of multiple types.

A need exists for a method for communication from a utility which reaches all possible forms of communication devices, so that all members of the public can be reached.

A need exists for a method that can transmit a message in multiple languages to multiple user devices to inform the public of emergency situations, and general information simultaneously.

The present embodiments meet these needs.

BRIEF DESCRIPTION OF THE DRAWINGS

The detailed description will be better understood in conjunction with the accompanying drawings as follows:

FIG. 8 depicts computer instructions useable with the present method for digitally notifying customers of a utility.

Figure 1:
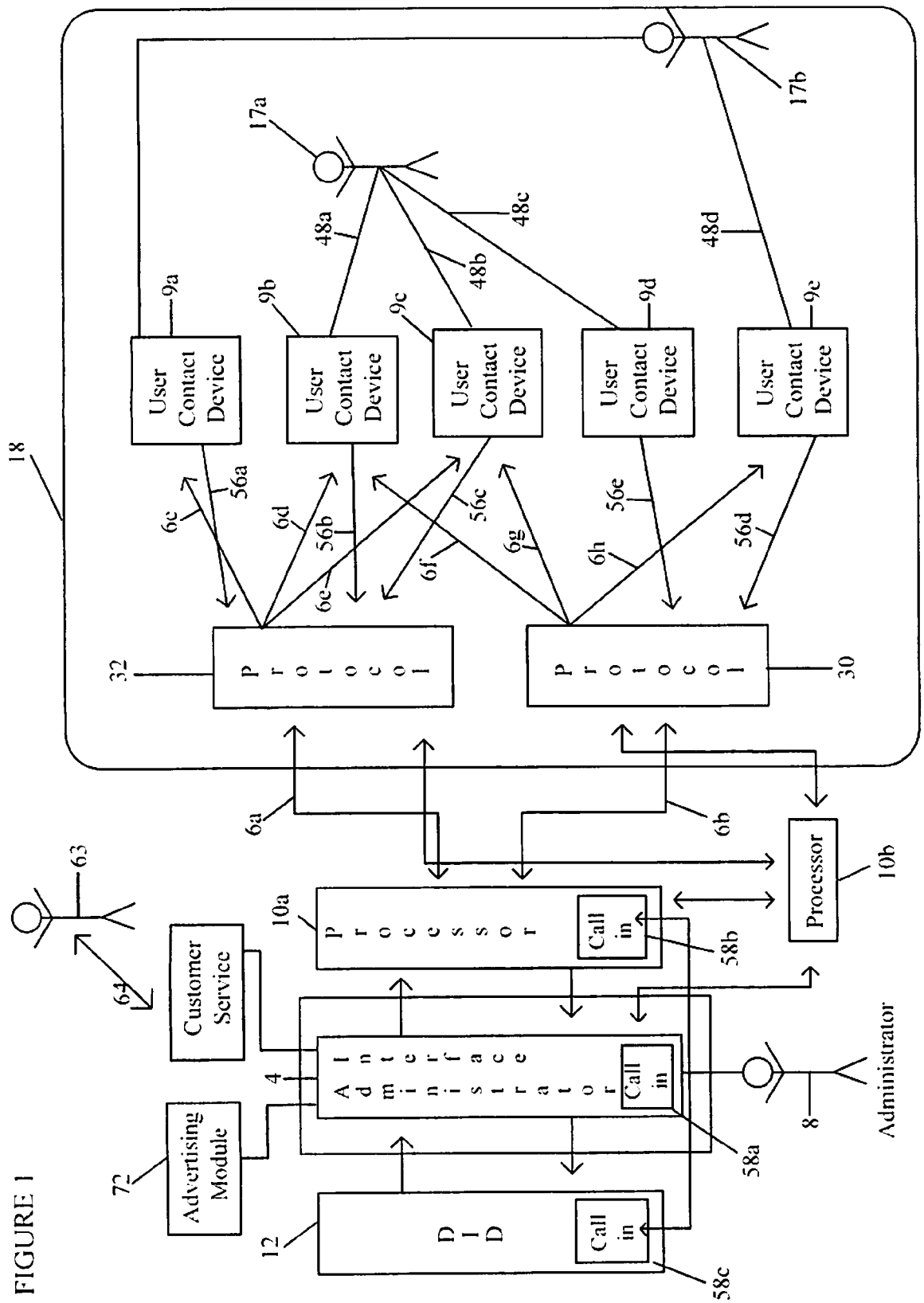
FIG. 1 depicts a representation of an embodiment of a system for transmitting messages to a user of a utility useable with the present method.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to a method for digitally notifying customers of a utility. The utility can be a gas utility, a water utility, an electricity utility, a telephone utility, or combinations thereof.

The present embodiments relate to the creation and delivery of messages from the utility, to the routing of messages from the utility, and to the verification and collection of responses to the message form the utility. The present method is universally applicable to, and independent of, the type of user contact device selected by the users.

The present embodiments relate to the simultaneous transmission of a message in multiple languages to a user contact device, such as Spanish. The language of the message can be determined based on user contact information.

The embodiments of the present method for digitally notifying customers of a utility provide a timely and uniform manner to contact numerous utility customers through numerous customer contact devices, such as a cellular telephone, a television, a light emitting diode (LED) display, a land phone, an e-mail address, a fax machine, a pager, a digital display, a TTY/TDD device, an instant messaging device, a handheld wireless device, including personal digital assistants (PDAs) and Blackberries™, and combinations thereof.

The method can be used to contact customers when the utility needs to deliver a message to the customers of the utility. The utility may need to contact customers to alert them to specific situations. For example, the utility may need to provide notification of brown outs, to notify a customer of an unpaid bill, to notify customers to wash their clothes after 10:00 PM, such as when the avoidance of energy consumption during peak hours is necessary, to inform customers when a power pole is down or service is interrupted, or combinations thereof.

The present embodiments provide a method that utilizes high speed notification and response. In an embodiment, real time digital user data can be received from a utility using an application programming interface. The application programming interface can be in communication with a processor and a network, such as a local area network, a wide area network, a virtual private network, an asynchronous transfer mode network, a synchronous optical network, a call center interface, a voice mail interface, a satellite network, a wireless network, a WIFI network, a WiMax network, or combinations thereof.

The real time digital user data can be stored in a dynamic information database in communication with the processor. The dynamic information database can also be in communication with the network. The real time user data can include an user name, address, phone number, user device address, social security number, account code, and combinations thereof. The real time digital data can be provided by the user or the utility.

It is contemplated that in an embodiment, the dynamic information database can be encrypted. The encrypted dynamic information database can have at least one encryption key, such as a 1024 bit AES encryption key.

An embodiment of the method includes forming at least one group of users of the utility. The groups are formed using the real time digital user data and using utility identified grouping information. The utility identified grouping information can include instructions for classifying users, such as by location, by payment history, by type of account with the utility, type of services received from the utility, or by any other classification or grouping.

In an embodiment one or more groups of users can have a group identification. The group identification can identify the groups of users by area code, zip code, or any other type of classification. A user can be a member of multiple groups.

For example, a utility can form a group of users that includes all customers of the utility that have a bill that is more than 30 days overdue, and a second group of users that includes all customers that reside in Galveston, Texas. Messages relating to payment options and collections can then be efficiently transmitted to the first group of users, while messages relating to inclement weather and power outages in Galveston can be transmitted to the second group of users. Grouping of users allows each user within a group to be treated identically by the present method, allowing the present method to transmit messages systematically to large groups of users without searching the dynamic information database each time a message is sent.

One or more of the groups of users can be represented as a list. The list allows for accurate indexing of the users within the group of users. The list can be a searchable list and can include any items of real time digital user data.

Each user within each group of users has at least one user contact device, such as a telephone, an e-mail address, a handheld wireless device, or another similar device. Each user contact device has associated user contact device information. The user contact device information can include the type of user contact device, a unique identifier of the user contact device, such as an IP address or mac address, a manner in which the user contact device is to be contacted, such as a telephone number or e-mail address, and other similar information for enabling each user contact device to be contacted using the present method.

It is contemplated that in an embodiment of the method, the application programming interface can receive a user message with real time digital user data from each user contact device, and that the real time digital user data can be updated in the dynamic information database using the user message. For example, a user who has relocated and changed addresses and home telephone numbers can use a user contact device to transmit updated real time digital user data to the application programming information, such as by sending an e-mail to the utility.

The method can include forming a first group of user contact devices for each user in the one or more groups of users, and forming a second group of user contact devices for each user. The first group of user contact devices and the second group of user contact devices can be formed using utility identified user contact device priority information.

The utility identified user contact device priority information can be part of the real time digital user data or can be provided independent of the real time digital user data, and is contemplated to include a priority order in which each user contact device is to be contacted. For example, each user having multiple user contact devices can indicate a preferred first contact device, which can be placed in the first group of user contact devices. Additional user contact devices for the same user can be placed in the second or subsequent groups of user contact devices. The first group of user contact devices can then receive a message from the utility before the second group of user contact devices, ensuring that users receive messages on their preferred first contact devices before the utility contacts alternate user contact devices.

It is also contemplated that the first group of user contact devices can include user contact devices of critical users. For example, during an emergent situation, user contact devices of emergency response personnel, hospitals, and customers having special needs can be placed in the first group of user contact devices, to be contacted before the user contact devices of other users, thereby maximizing the response time provided to critical users in an emergent situation.

The method can include transmitting one or more messages from the utility, through the application programming interface, to at least one of the user contact devices in the first group of user contact devices, using at least two industry standard gateways simultaneously and the utility identified user contact device priority information.

Messages can be transmit automatically from the utility to a group of users when specific conditions arise, or in the alternative, the method can include transmitting a message to a user or groups of users when initiated by an administrator. The method can be used to contact a large number of users in a systematic manner based upon a priority order.

The message from the utility can include activation of an audio alarm, such as a digital multi tone file (DTMF), a visual alarm, such as a blinking light, or combinations thereof. In another embodiment, a designated ring tone can be used for each message. The designated ring tone can be selected by the user, the administrator, or the manufacturer of the user contact device.

The user contact devices are contemplated to be contacted in the order defined by the utility identified user contact device priority information.

It is further contemplated that the messages are simultaneously transmitted to each of the user contact devices in the first group of user contact devices before being transmitted simultaneously to each of the user contact devices in the second group of user contact devices.

The industry standard gateways can include a SMTP gateway, a SIP gateway, and H.323 gateway, and ISDN gateway, a PSTN gateway, a softswitch, and combinations thereof.

The present method can include the step of receiving response information from each user contact device by the application programming interface through the two or more industry standard gateways simultaneously. Response information can include a text response, an audio response such as a tone file, a visual response such as a blinking light, or other similar responses. Responses can be transmitted automatically by each user contact device upon receipt of a message, or the responses can be transmitted when initiated by a user.

The present method further includes ensuring that each user is contacted on the first group of user contact devices before being contacted on the second group of user contact devices. This can be performed by tracking the transmission of messages and the receipt of response information. For example, the present method can be used to contact all users located near downed power lines and warn the users to remain clear of the area, before contacting users whose electricity may be affected by the downed power lines.

In an embodiment, the present method can include the step of removing duplicate user contact devices from the user contact device information. For example, if a husband and wife are users of a utility, the method can include identifying that the a home telephone being used as a contact device for both the husband and wife is a duplicate, so the contact device will be contacted only once with a message.

In an embodiment, the application programming interface can control an administrator interface. The application programming interface can provide additional code or instructions to the administrator interface for creating and transmitting messages to user contact devices. The instructions can be XML code, a flat text file, or similar code. The application programming interface can receive information from a tool developed by a third party company and deploy the use of the tool.

The method can further include using the application programming interface to control the administrator interface to only transmit the one or more messages within a predefined time interval. The application programming interface can also allow the administrator to override the predefined time control via a manual override for suppressing the predefined time interval, to allow messages to be transmitted at any time, such as when an emergency occurs.

It is further contemplated that the application programming interface can be used to form new groups of users using user contact device information and instruction from the utility. For example, the utility could provide instruction that a new group of users should be formed for users who have not paid their bill in the last 30 days, and the application programming interface would be used to form the new group of users that meets the selected criteria. The related contact device information for each user in the new group of users would be applied to the new groups accordingly, allowing each user within the new group of users to receive messages sent to the new group of users.

In an embodiment, the user contact devices can be resorted based on administrator selected user contact device information. It is contemplated that resorting the user contact devices can include associating one or more user contact devices with different groups, altering the priority information for one or more user contact devices, ordering each user contact device within one or more groups by a selected item of user contact data, such as the type of contact device, and other similar groupings or sortings.

A message can then be transmitted to the resorted user contact devices. The message transmitted to the resorted user contact devices can indicate any changes that have been made, or the message can indicate only that resorting has occurred.

It is further contemplated that the present method can include transmitting a survey to one or more of the user contact devices. The survey can be used to ensure that users are satisfied with their utility services, or to determine if the user wants to upgrade utility services. The survey could also be used to request additional information, such as user contact information, to help to keep the utility's records and user information current. A response to the survey can be received using the application programming interface. The response can be stored in the dynamic information database. Survey responses can be used to generate one or more reports.

It is also contemplated that the method can include the step of generating a searchable list of the last message sent to a user contact device in the dynamic information database. This searchable list can allow one or more recently-transmitted messages to be retransmitted to a user upon request. The searchable list can also be used to track transmitted messages and received responses to ensure that each user has received one or more messages. The searchable list is also useful for ensuring that messages are transmitted to the first group of user contact devices before being transmitted to the second group of user contact devices.

Use of the present method can be illustrated using the following example:

An application programming interface, in communication with an Intel™ processor and the internet, can be used to receive real time digital user data, such as the names, addresses, and contact device information for multiple users of a utility, such as Reliant Energy. The utility can provide this information by inputting data from its customer records to the processor, however it is also contemplated that one or more customers could also provide the real time digital user data by transmitting the data to the utility by submitting an on-line form using a computer, cellular telephone, personal digital assistant, or similar contact device.

One or more groups of users can be formed from the real time digital user data using utility identified grouping information, which can include instructions from Reliant Energy for classifying users. For example, Reliant Energy may wish to place all users who have a bill more than 30 days past due into a single group for communication regarding payment options. Reliant Energy can also form other groups of users, such as all users within a single power grid, who can be grouped by location to receive messages relating to power outages or brown outs in their respective areas. A user can be a member of multiple groups.

Each user will have at least one user contact device, such as a home telephone, an e-mail address, or a pager, and the user contact devices are formed into at least a first group and a second group using utility identified user contact device priority information. For example, a user, Mary Smith, may have a home telephone number 832-281-7134, placed in the first group of user contact devices, and an e-mail address, Mary42427@yahoo.com, placed in the second group of user contact devices.

The utility identified user contact device priority information can identify which user contact devices should be contacted first, and be placed in the first group of user contact devices, which will be contacted before the second group of user contact devices, depending on the nature of the message to be transmit. For example, Reliant Energy customers located in the vicinity of a downed power line may have contact devices grouped in a first group of user contact devices, for receiving a transmitted warning message about the downed power lines, before users remote from the area, having user contact devices grouped in the second group of user contact devices, are contacted.

The first group can also include one or more users' preferred first method of contact, while the second group includes a preferred alternate contact. For example, Mary Smith may prefer to be contacted using her home telephone first, then only contacted using her e-mail address if attempts to contact her using her home telephone are unsuccessful.

At least one message, such as "Your Reliant Energy bill is more than 30 days overdue," or "Power lines are down in Southeast Houston; Expect rolling brown outs until 12:00 AM" is then transmitted from the utility through the application programming interface to at least one user contact device in the first group, using at least two industry standard gateways simultaneously. For example, the message can be sent using a SMTP gateway and a SIP gateway simultaneously. This redundancy maximizes the chance that each message reaches each user contact device.

The message is simultaneously transmitted to all user contact devices in the first group, in this example Reliant Energy customers in the vicinity of the downed power lines, before being transmit to each user contact device in the second group, in this example, all other Reliant Energy customers whose electricity may be affected by the downed power lines.

Each contacted user device then transmits response information, such as an audio tone file, indicating receipt of the message. Receipt of the audio tone file response by the utility allows the utility to verify that the user received the message. If a user contact device is not reached, error-in-response information can be generated, so that Reliant Energy can track which items of user contact information are invalid.

Through receipt of response information and tracking of transmitted messages, the utility can ensure that each user contact device of the first group was contacted before each user contact device of the second group.

The embodiments of the invention can be best understood with reference to the figures.

FIG. 1 depicts an embodiment of a digital notification and response system that can be used to perform the embodiments of the present method. The system is usable with a network 18, such as the internet, wherein an administrator 8, such as an account manager for Reliant Energy, can transmit one or more messages 6a through 6h, such as "Your electricity bill is over 30 days past due," to one or more user contact devices 9a, 9b, 9c, 9d, and 9e, which can include telephones, e-mail addresses, pagers, or similar devices, using an application programming interface 4. The application programming interface 4 is in communication with one or more processors 10a and 10b, such as an Intel, Athlon, or AMD processor, the network 18, and a dynamic information database 12, such as a SQL database. The application programming interface 4 can be used to receive real time digital user data, such as user names, addresses, and user contact device information, from a utility.

The administrator 8 can be a person, a computer, an agency, an analog notification system, another digital notification and response system, a governmental agency, or combinations of these entities.

The administrator 8 can interact with the application programming interface 4 to begin the process of sending one or more messages, which are shown in FIG. 1 as 6a through 6h, to one or more user contact devices 9a, 9b, 9c, 9d, and 9e.

The application programming interface 4 can be in communication with a local area network, a wide area network, a virtual private network, asynchronous transfer mode network, a synchronous optical network, a call center interface, a voice mail interface, a satellite network, a wireless network, a WIFI network, a WiMax network, or other similar means to transmit and receive a message to or from numerous user contact devices.

The message can be a text message, a numerical message, one or more images, an audio message, or a combination of these. The message can be encoded.

The message can include a designation that identifies the importance of the message. Examples of these designations include low priority, general priority, significant priority, high priority, or severe priority. The designations can coincide with the Homeland Security five-color system. The designations can be color-coded, such as green for a low priority message, blue for a preparedness message or general priority message, yellow for a cautionary message such as a significant priority, orange for an emergency message or high priority message, or red for a critical message with a severe priority. The priority levels can be customized to incorporate different levels of emergencies, or they can be tailored to standards for a particular industry, such as building owner and managers standard codes for risks or emergencies in a building.

As shown by FIG. 1, the message is then transmitted to various devices. The message is formed by an administrator 8 using the application programming interface 4, data from the dynamic information database (DID) 12, and at least one processor, shown in FIG. 1 as two linked processors 10a and 10b, a "processor cluster," to transmit one or more messages through at least two standard industry gateways 30 and 32, such as a SMTP gateway and a SIP gateway, simultaneously.

The industry standard gateways 30 and 32 are part of the network 18, which is in communication with user contact devices 9a, 9b, 9c, 9d, and 9e. The user contact devices 9a, 9b, 9c, 9d, and 9e are controlled by one or more users 17a and 17b, such as individual customers or groups of customers of El Paso Energy. The users contact devices 9a and 9e are depicted being controlled by a first user or group of users 17a, and user contact devices 9b, 9c, and 9d are depicted being controlled by a second user or group of users 17b. Users 17a and 17b can be in different groups of users. The message can be transmitted to each user contact device of user 17a before being transmitted to the user contact devices of user 17b.

It is also contemplated that user contact devices 9a and 9b could be in a first group of user contact devices, which includes preferred first user contact devices for users 17a and 17b, while user contact devices 9c, 9d, and 9e are in a second group of user contact devices. User contact devices 9a and 9b, each user's preferred first user contact device, could then be contacted before user contact devices 9c, 9d, and 9e are contacted. The groupings of user contact devices are determined by the utility provided contact device priority information.

The users can be individuals or entities that are customers of a utility. The users can receive a message, send a message, respond to a message, receive more than one message, respond to more than one message, or combinations of these activities.

Examples of usable user contact devices include handheld wireless devices, wireless phones, land phones, e-mail addresses, digital displays, a light emitting diode (LED) display, fax machines, pagers, webpages, TTY/TDD devices, instant messaging devices, and similar devices that capable of receiving a message. Examples of a handheld devices include a personal digital assistant (PDA), a Blackberry™, or a cellular telephone.

The message(s) 6a through 6h can be stored in the dynamic information database 12.

The messages can be prewritten and/or prerecorded messages stored in the database for subsequent use by the administrator 8, or the messages can be generated from the dynamic information database 12 by the administrator, creating custom messages based upon inputs from the administrator.

Each message can be given a designation which can be textual, color coded, imaged with an icon, animation, or combinations thereof. If textual, a designation can read, low priority, general priority, significant priority, high priority, or severe priority. A color coded designation can be a color associated with a priority, such as red for severe priority and green for low priority. The message can contain an image or icon, which the user can pre-select to represent the priority of the message, such as an exclamation point for emergencies. The messages and priority codes can be prewritten and stored in the dynamic information database 12 for subsequent use by the administrator.

Once the message has been received by the one or more user contact devices, a response can be transmitted from those contact devices indicating that the message has been received. The responses 56a, 56b, 56c, 56d, and 56e, which can include textual responses, audio tones, or visual responses such as blinking lights, can be transmitted back through the two industry standard gateways 30 and 32 simultaneously to the processors 10a and 10b, and stored in the dynamic information database 12.

The response from the user of the network can be an audio file or a dual tone multi-frequency tone (DTMF).

In addition, a customer server interface 64 can be in communication with the application programming interface 4.

The customer server interface 64 can have a GUI interface, connected to the network for use by a customer service support representative 63, to assist users with the system. The customer service interface can contain text boxes of instructions for enabling users to obtain customer service services. The customer service interface can have the dual utility of being adapted to transmit out alerts as well, providing a redundancy, should the primary administrator interface fail.

An advertising module 72 can be in communication with the application programming interface 4. The advertising module 72 can enable an advertiser to place ads, such as advertisements for credit cards, automobile dealers, or clothing stores, in association with a message for transmission. The ads can be stored in the dynamic information database 12. The advertising module is usable to hold audio files, images files, video files, such as banner ads of an advertiser, and place the ads before or after a message, as a method to enable users to self-fund implementation of the system.

The advertising module 72 can be used to insert header and footer files in the message to personalize the message to the group of users to whom the message is addressed.

FIG. 1 also shows a call in feature, which enables users to call in and retrieve previously sent messages and receive updates. In one embodiment, the call in feature 58a can be contained in the administrator interface (shown in FIG. 3). In another embodiment, the call in feature 58b can be contained in one of the processors. In still another embodiment, the call in feature 58c can be contained in the dynamic information database. The call in feature can be contained in any combination of these features.

Figure 2:
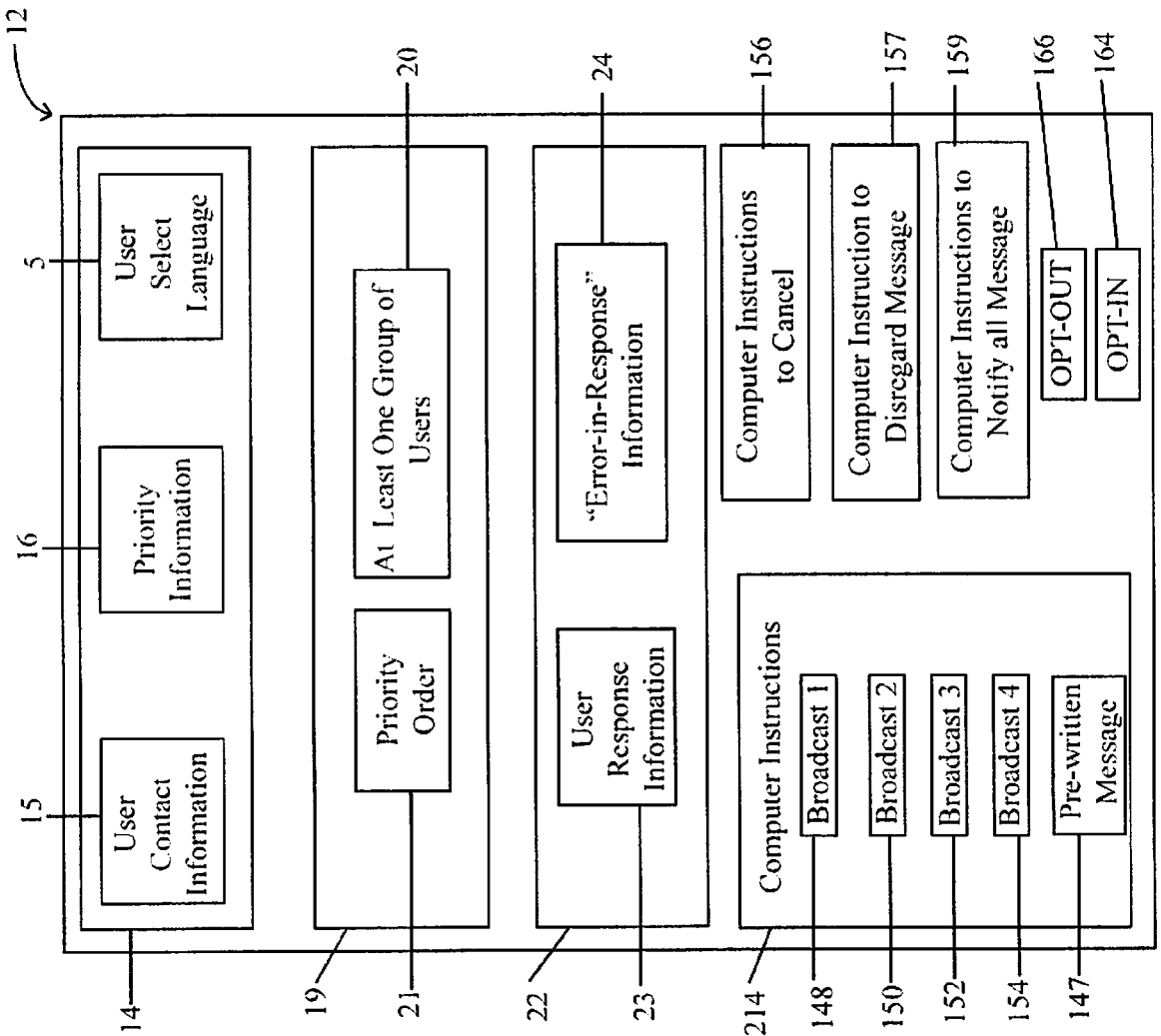
FIG. 2 depicts a representation of an embodiment of a dynamic information database usable with the present method for transmitting messages to a user of a utility.

FIG. 2 shows a schematic of the dynamic information database 12 useable with the present method. The dynamic information database includes user contact information 14, which includes user contact device information 15, such as a telephone number, e-mail address, or IP address of a computer, and utility provided user contact device priority information 16, which can include instructions from the utility regarding the order in which each user contact device should be contacted. In another embodiment of the invention the user contact information 14 can include a user selected language 5, such as Spanish, for the message.

The user contact device information 15 can include an e-mail address, a user device internet protocol (IP) address, and combinations thereof. Each user contact device can include information that can be unique to each individual user contact device or can include information that can be common to all user contact devices. For example, a serial number for a cell phone, a Mac address for an Ethernet card, and other similar information can be included.

The user priority information includes the order in which the user wants the user devices to be contacted. For example, a particular user may desire that a Blackberry™ be contacted first, a cellular telephone second, a home telephone third, and then an e-mail fourth. However, all messages can be transmitted simultaneously to all devices, if needed.

Additionally the dynamic information database 12 contains grouping information 19 which includes at least one group of users 20. For example, a group of users can include FIMA employees, or users of a defined geographic area, such as Houston 100-year flood zone inhabitants.

In an embodiment, the grouping information can have an utility identified user contact device priority information 21.

The utility identified user contact device priority information 21 directs the application programming interface 4 to contact a first group of contact devices, for this example, a user contact device indicated as a first contact. After all of the contact devices in the first group of contact devices have received the message, the utility identified user contact device priority information directs the application programming interface to contact a second group of user contact devices, which can include user contact devices indicated as a second contact. Then, the application programming interface continues to relay messages to contact devices based on the utility identified user contact device priority information, until all contact devices are reached and a response is provided from the contact devices. The utility identified user contact device priority information can be selected by the utility.

The dynamic information database can further include response information 22, such as audio tones or textual responses transmitted from each user contact device receiving a message, which can be transmitted from the user contact devices through at least the two standard industry protocols 30 and 32, simultaneously through the processors 10a and 10b, to the dynamic information database 12.

The response information 22 provides information indicating whether the user contact devices received the message. The response information 22 can include user response information 23 that indicates the user device has received the message, or "error-in-response" information 24 that indicates the user device has not received the information, perhaps because contact information was insufficient and the message could not be delivered properly. The "error in response" information 24 can also indicate that an email address, phone number, or contact device is invalid.

FIG. 2 also shows the dynamic information database 12 (DID) including computer instructions 214 for enabling the processor to broadcast at a future time, a message on a specific date and time 148, such as a broadcast on Monday, Aug. 8, 2006 at 5:55 pm. Computer instructions for instructing the processor to broadcast the message at predetermined periodic intervals 150, such as every Tuesday in the month of August at 7:00 am, can also be included in the DID.

The dynamic information database can include computer instructions to broadcast the message to a defined geographic area 152, such as all users of a single power grid in Southwest Houston, and computer instructions to broadcast the message to select wireless devices 154, such as all users who have called into the system using a call-in feature within the past 24 hours.

The broadcasts can be transmitted using prewritten messages 147 or custom designed messages.

The dynamic information database (DID) can also include computer instructions enabling the administrator to cancel a message 156 in progress or a message scheduled for delivery at a future date and time. The dynamic information database also includes computer instructions enabling enable administrators to transmit a "disregard" message notification 157 for users that received the message while administrators cancel messages in progress.

In an embodiment, the DID includes computer instructions for notifying the administrator when all messages have been delivered to the target users 159.

In an embodiment, the DID can have computer instructions allowing users to opt-in 164, allowing users to receive messages using the present method. Users can opt-in using a user contact device, or through other means, such as contacting the utility directly.

In an embodiment, the DID can include computer instructions providing an opt-out 166, permitting one or more users to opt-out from receiving messages. It is contemplated that users can opt-out through the same means by which they can opt in. Through use of the opt-in and opt-out features, the user can opt-in to begin receiving messages from the system or opt-out to remove themselves from receiving further messages.

The dynamic information database 12 can include a SQL™ database, a MySQL™ database or other industry standard databases, an Oracle™ database, or another similar database that can organize information in a similar manner.

The industry standard gateways can include a Megaco/H.248 protocol, simple message transfer protocol (SMTP), a short message service protocol (SMS,) a multimedia message service protocol (MMS), an enhanced message service protocol (EMS), a media protocol control protocol (MGCP), a SIP protocol, a H.323 protocol, and ISDN protocol, a PSTN protocol, and combinations thereof.

Figure 3:
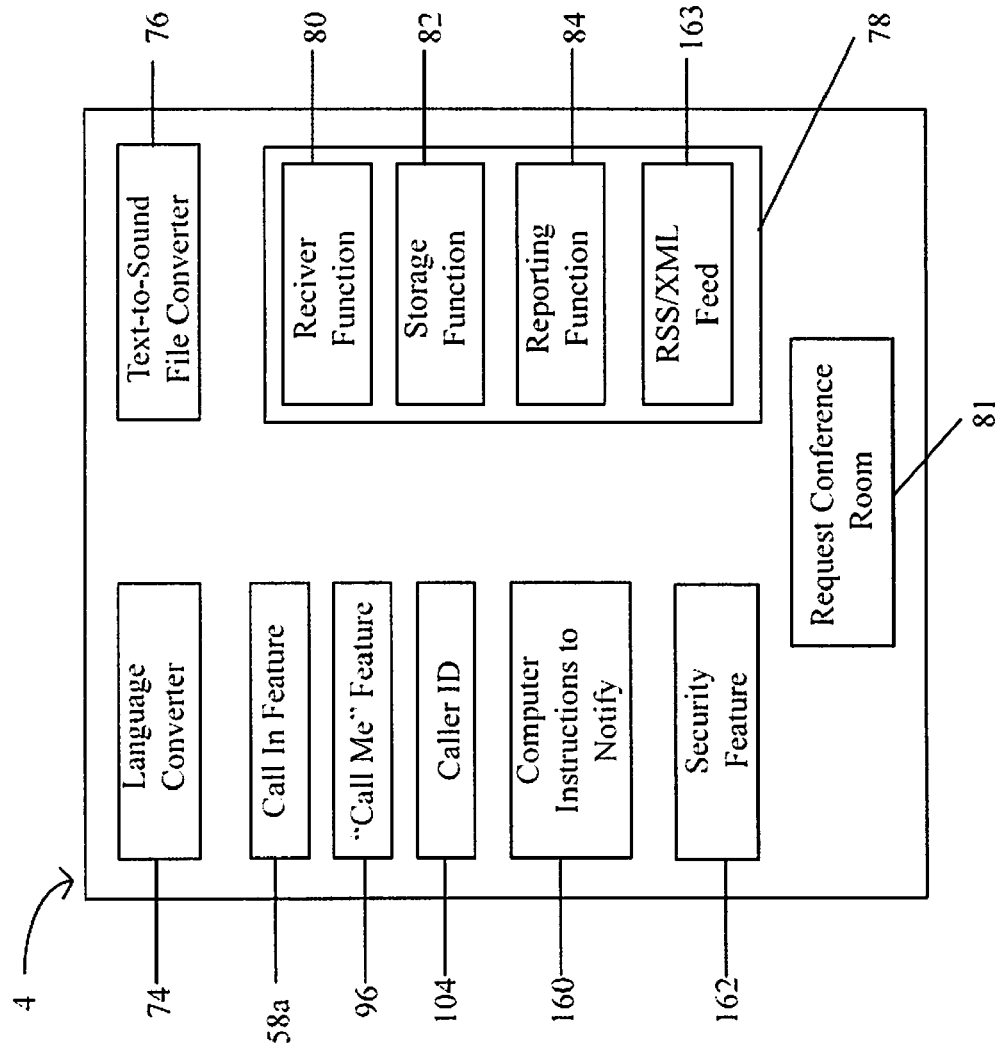
FIG. 3 depicts an embodiment of the administrator interface useable with the present method for transmitting messages to a user of a utility.

FIG. 3 depicts a diagram of the components of an embodiment of the application programming interface 4 useable with the present method. The application programming interface 4 has a "call in" feature 58a enabling an administrator 8 to call the digital notification and response system to send a message to at least one user contact device on the network. The "call in" feature, is shown located in one or more devices; "call in" feature 58a can be in the application programming interface 4, "call in" feature 58b can be in one of the processors 10a, and "call in feature" 58c can be located in the dynamic information database 12.

The application programming interface 4 also has a language converter 74, such as Systrans™ or Babelfish™, for translating the message to be transmitted into a user selected language. For example, an administrator could prepare a message in English, and the language converter 74 could translate the message to Korean prior to transmission of the message. The application programming interface 4 can have a text-to-sound file converter 76, such as Microsoft Speech Server™, for translating the message from text to a sound file. For example, an administrator could prepare a textual message, and the text-to-sound file converter 76 could convert the text file to an audio speech file prior to transmission.

The application programming interface 4 can include a responder module 78, which can include a receiver function 80, for receiving responses from the user contact device that reply to the message. The responder module 78 can include a storage function 82 for recording the received responses in dual-tone-multiple frequencies (DTMF) or interactive voice response (IVR) format in the dynamic information database 12. The responder module can include a reporting function 84 for creating reports 200 (shown in FIG. 4) using the received responses.

The responder module can also include a "really simple syndication" (RSS)/XML "extensible mark up language" feed 163 from a reliable source, such as CNN news, and the feed can be pushed out to the user devices from the processor that receives the feed 163. For example, one or more users, which can opt-in to receive the feed or be selected to receive the feed by the utility, can receive periodic news updates using the present method. The feed 163 can be filtered, allowing users to receive news updates relating only to selected topics, which can be selected by the utility or by individual users.

The application programming interface 4 can further include computer instructions enabling an administrator to request an electronic "conference room" 81 that can be entered by users of the system. The "conference room" can include a textual interface, such as for receiving and displaying text messages or messages from instant messaging programs. The "conference room" can be telephonic, allowing users and administrators to have verbal, real time conversations using telephones and similar devices.

The application programming interface 4 can further include computer instructions for notifying the administrator when all messages have been delivered to the target users 160.

In an embodiment, the administrator interface can have a security feature 162 for controlling access to the system. The security feature can allow for secure access, such as by using a bar code reader, a radio frequency identification device "RFID" tag reader, a scannable badge reader, a security token, a smart card reader, a biometric reader, magnetic card reader, and combinations thereof. Additionally the application programming interface 4 can have a computer instructions that provide a "call me" feature 96. The "call me" feature enables an administrator 8 to compose a message to send out to a user or groups of users of a network.

Also, the application programming interface 4 can include a "caller ID" feature 104 enabling a user to call a number, use an account code, obtain messages previously transmitted to that user, and update messages currently being transmitted to the user.

Figure 4:
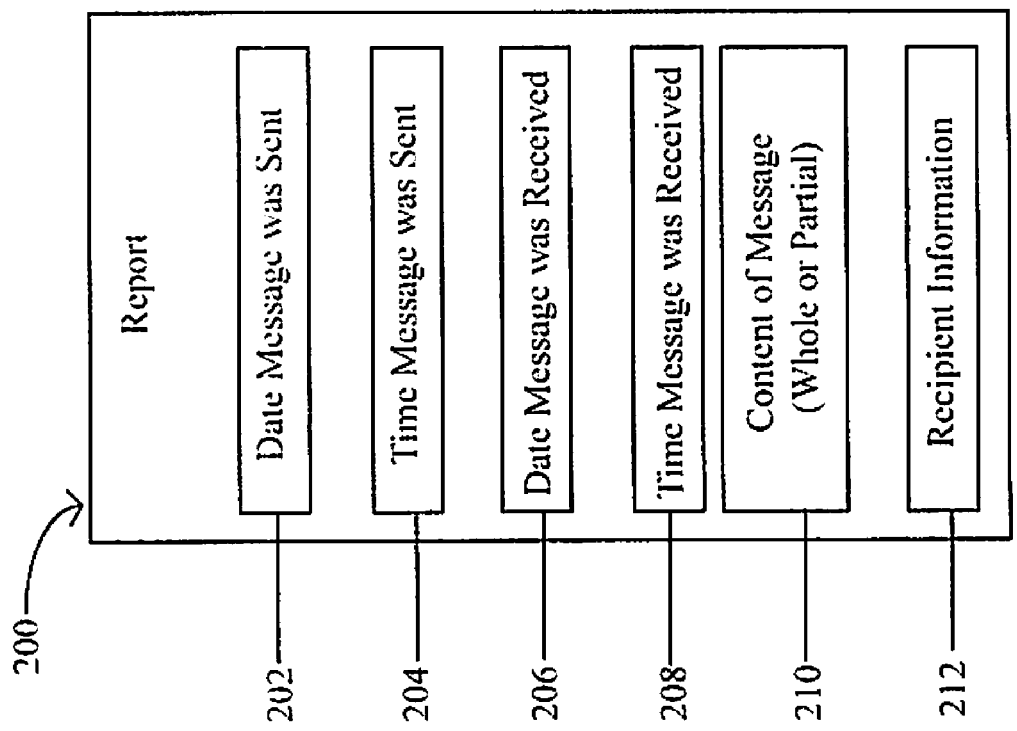
FIG. 4 depicts a representation of an embodiment of a report able to be produced using the present method.

FIG. 4 depicts an embodiment of a responder module which can be used to create reports 200. The report can include a date the message was sent 202, such as May 5, 2004, a time the message was sent 204, such as 2:30 PM, a date the message was received 206, such as May 5, 2004, a time the message was received 208, such as 2:33 PM, content of the message, such as "Your bill is more than 30 days past due," which can be in part or the whole message 210, recipient information of the message 212, such as "Mary Smith, 408 W. Dale Ave. 77077, 832-281-7134" and combinations of these elements. The reports can be generated by the administrator, a user, or both.

Other examples of information that can be included on a report are the names of the person who received the message, a copy of any voice mails transmitted with the message or associated with a particular message, a time when an e-mail message was read, the time when a fax was printed by the user. The report can be transmitted to users of the network, requesting a second response from at least one user of the network The administrator can create custom designed reports, such as reports specific to users having overdue bills, or standard reports, such as reports indicating which users received and failed to receive a message. Reports can be generated from the dynamic information database for use by the administrator.

Figure 5:
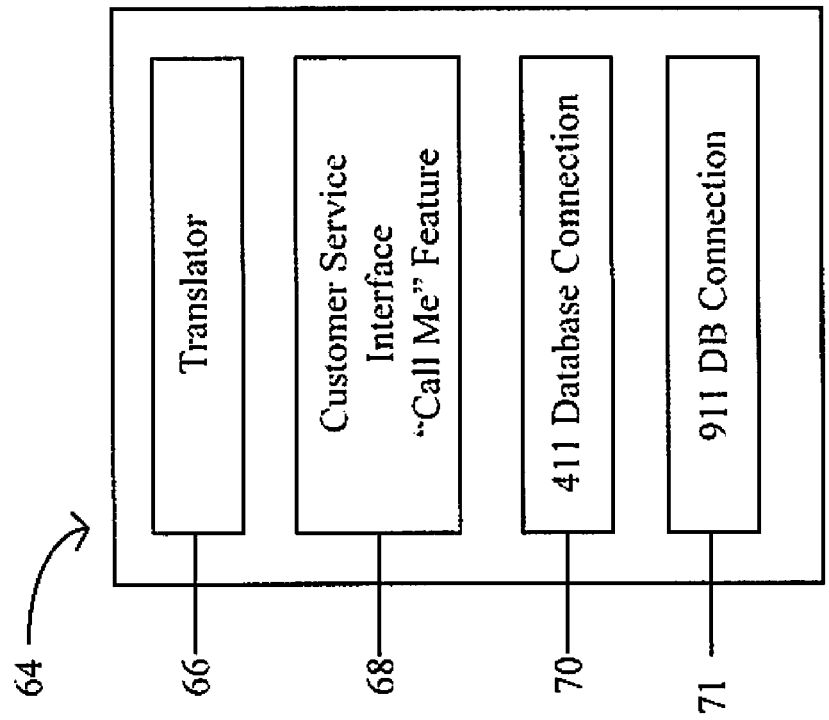
FIG. 5 depicts an embodiment of a customer service interface useable with the present method for transmitting messages to a user of a utility.

FIG. 5 shows a diagram of the customer service interface 64 which can have a translator 66, such as an individual that can speak multiple languages, a customer service interface "call me" feature 68, a 411 database connection 70, which can provide information regarding the system and other general information to users, and a 911 database connection for users of the network 71, for allowing users to alert the utility regarding emergent situations. The call me feature can have any one or more of these elements and be usable herein.

Figure 6:
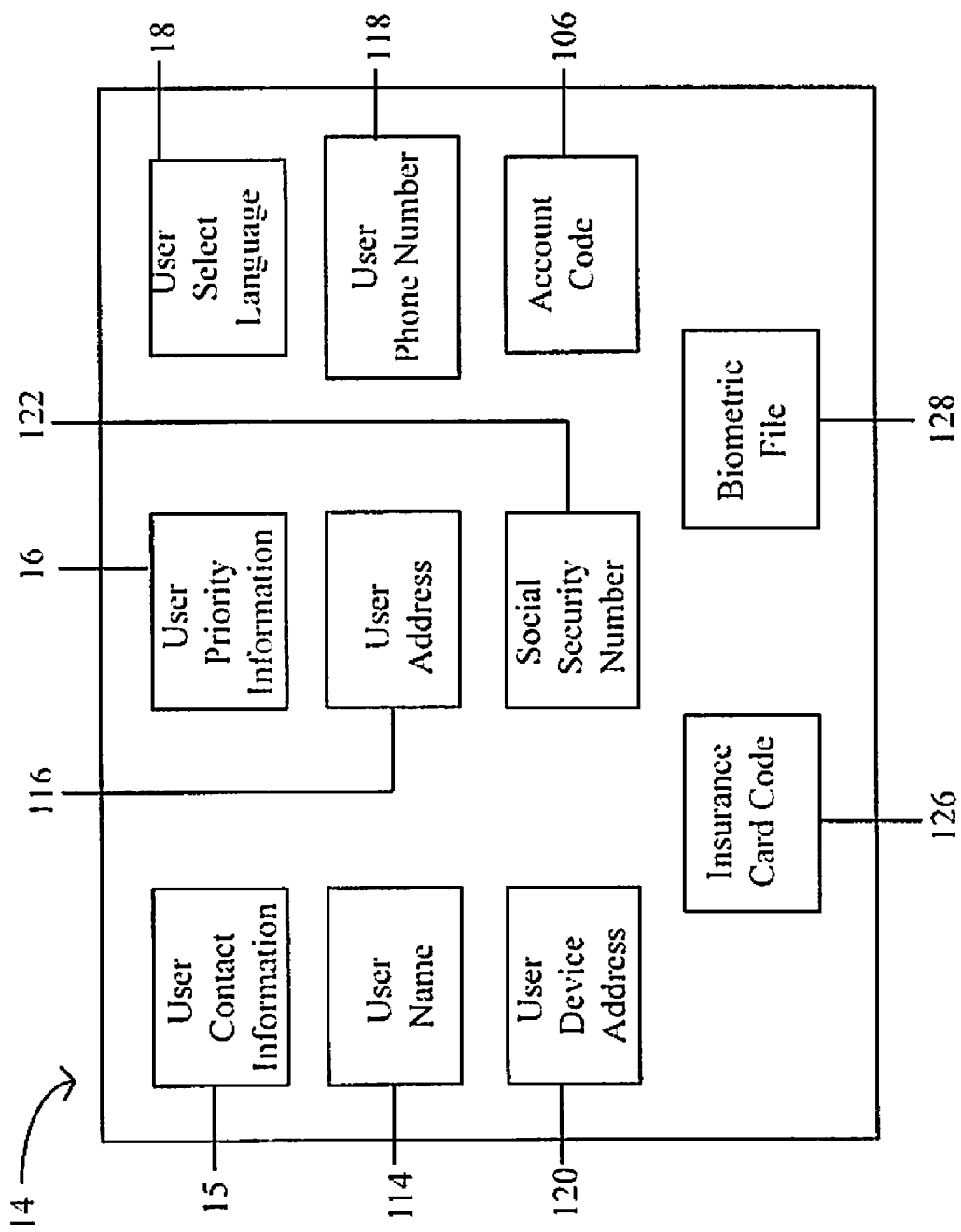
FIG. 6 depicts user contact device information associated with the present method for transmitting messages to a user of a utility.

FIG. 6 shows a diagram of user contact information 14 resident in the dynamic information database 12. The user contact device information can include user contact device information 15, utility provided user contact device priority information 16, and a user selected language 18 for the messages.

The user selected language 18 for the message can be any language, such as Chinese, Dutch, English, French, German, Italian, Japanese, Korean, Norwegian, Portuguese, Russian, Spanish, Swedish, Vietnamese, or other additional languages.

The utility identified user contact device priority information 16 indicates a contact order for various user contact devices. The contact order can be used to direct the order in which the dynamic information database transmits a message to the user contact devices.

The utility provided user contact device priority information 16 can also contain a priority order that directs the administrator interface to contact a first group of user contact devices indicated as a first contact. After all of the user contact devices in the first contact have received the message, the priority order directs the administrator interface to contact a second group of user contact devices indicated as a second contact. The administrator interface then continues to contact user contact devices based on the priority order until all user contact devices are reached and a response is provided from the user contact devices.

The user contact information 14 can include information associated with the user of the user contact device, including a user name, address, and other personal and/or identifying information relating to the user.

FIG. 6 depicts the user contact information having a user name 114, such as Mary J. Smith, a user address 116, such as 1143 E. $21^{st}$ street, a user phone number 118, such as 832-281-7134, a user device address 120, such as 70.138.229.62, a user social security number 122, such as 445-78-2207, an account code 106, such as 8481x, an insurance card code 126, such as 206-B7-8842, a biometric file 128, such as a fingerprint, and combinations thereof. The contact device information can be used by the user to obtain updates to the message by calling into the network.

Figure 7:
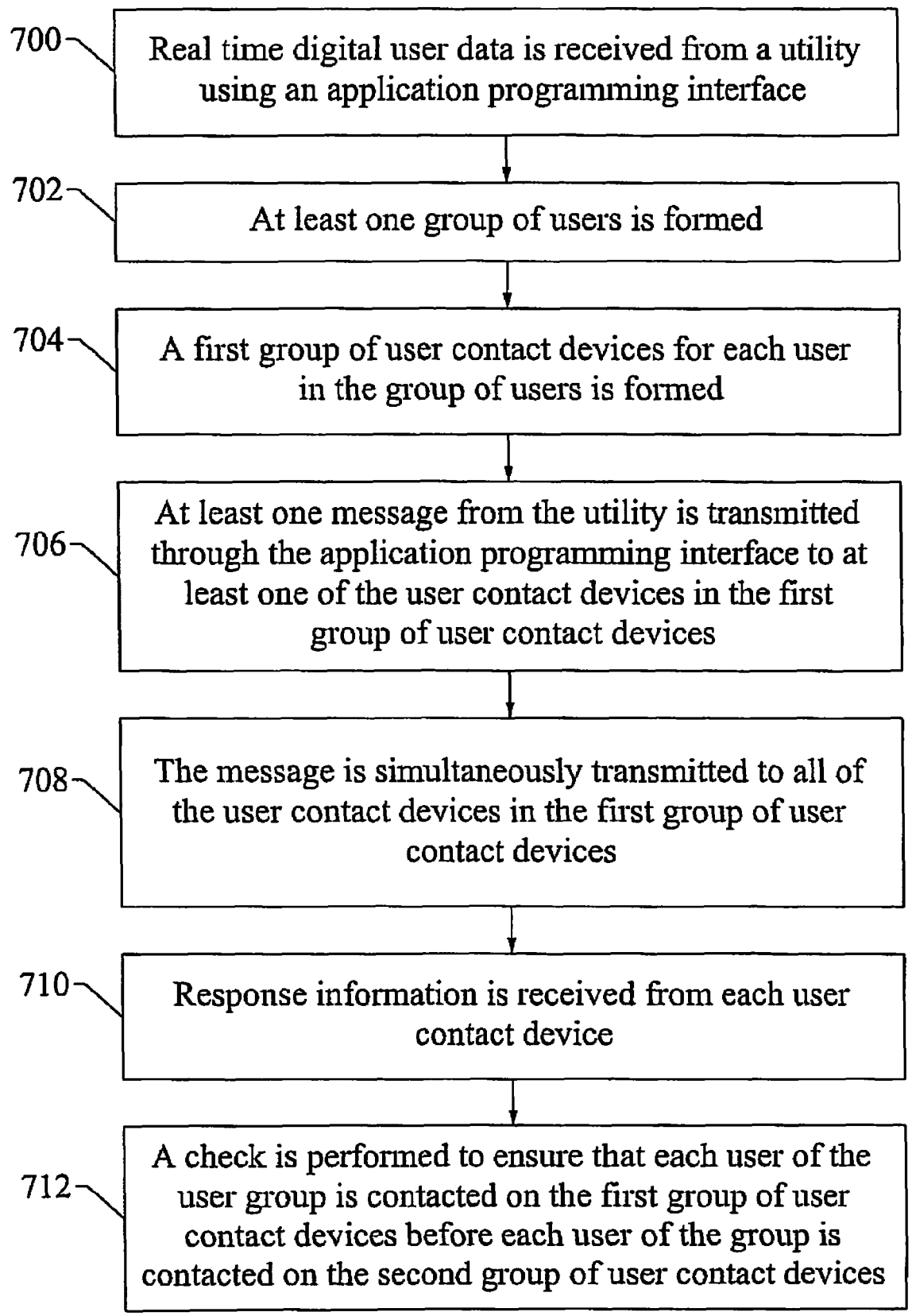
FIG. 7 depicts an embodiment of the present method for transmitting a message to a user of a utility.

FIG. 7 depicts an embodiment of the method for digitally notifying customers of a utility.

In step 700 real time digital user data is received from a utility using an application programming interface, and the real time digital user data is stored in the dynamic information database.

In step 702 at least one group of users is formed. The groups are formed using utility from the real time user data using utility identified grouping information, wherein each user in the at least one group of users has at least one user contact device; wherein each of the user contact devices has associated user contact device information.

In step 704 a first group of user contact devices for each user in the group of users is formed. In step 704 a second group of user contact devices for each user in the group of users can also be formed. The groups of contact devices are formed using utility identified user contact device priority information.

In step 706 at least one message from the utility is transmitted through the application programming interface to at least one of the user contact devices in the first group of user contact devices. At two industry standard gateway protocols are used simultaneously to transmit the message.

In step 708 the message is simultaneously transmitted to all of the user contact devices in the first group of user contact devices. Then in step 710 the message is transmitted simultaneously to each of the client contact devices in the second group of user contact devices.

In step 710 response information is received from each user contact device. The application programming interface is used to receive the response information, and the response information is transmitted from the client contact devices through the two industry standard gateway protocols simultaneously.

In step 712 a check is performed to make sure that each user of the user group is contacted on the first group of user contact devices before each user of the group is contacted on the second group of user contact devices.

FIG. 8 depicts computer instructions 801 for digitally notifying customers of a utility.

The computer instructions 801 can be stored on computer readable medium and can be in communication with a processor 10a. The processor 10a is in communication with a network, the dynamic information database 12, and the application programming interface 4.

The computer instructions 800 can instruct the processor to receive real time digital user data from a utility using the application programming interface. Computer instructions 800 can also instruct the processor to store the real time digital user data in the dynamic information database.

Computer instructions 802 instruct the processor to form at least one group of users of the utility from the real time user data. To form the group the computer instruction use utility identified grouping information.

Each user in the at least one group of users has at least one user contact device. Each of the user contact devices has associated user contact device information.

Computer instructions 804 instruct the processor to form a first group of user contact devices and a second group of user contact devices. The groups of user contact devices are formed using utility identified user contact device priority information.

Computer instructions 806 instruct the processor to transmit at least one message from the utility through the application programming interface to at least one of the user contact devices in the first group of user contact devices. The message is transmitted using at least two industry standard gateway protocols simultaneously.

Computer instructions 808 instruct the processor to transmit the at least one message simultaneously to at least one user contact device in the second group of user contact devices.

Computer instructions 810 instruct the processor to receive response information from each user contact device. The response is received using the application program interface, and are transmitted from the client contact devices through the two industry standard gateway protocols simultaneously.

Computer instructions 812 instruct the processor to ensure each user is contacted on the first group of user contact devices before each user is contacted on the second group of user contact devices.

The embodiments have been described in detail with particular reference to certain preferred embodiments, thereof, but it will be understood that variations and modifications can be effected within the scope of the embodiments, especially to those skilled in the art.

What is claimed is:

1. A method for digitally notifying customers of a utility comprising:

receiving real time digital user data from a utility using an application programming interface in communication with a processor and a network, and storing the real time digital user data in a dynamic information database in communication with the processor;

forming at least one group of users of the utility from the real time digital user data using utility identified grouping information, wherein each user in the at least one group of users has at least one user contact device, and wherein each of the user contact devices has associated user contact device information;

forming a first group of user contact devices for each user in the at least one group of users and a second group of user contact devices for each user in the at least one group of users, using utility identified user contact device priority information;

transmitting at least one message from the utility through the application programming interface to at least one of the user contact devices in the first group of user contact devices using at least two industry standard gateway protocols simultaneously and the utility identified user contact device priority information, wherein the at least one message is simultaneously transmitted to all of the user contact devices in the first group of user contact devices before being transmitted simultaneously to each of the user contact devices in the second group of user contact devices;

receiving response information from each user contact device by the application programming interface through the at least two industry standard gateway protocols simultaneously, wherein at least one of the at least two industry standard gateway protocols comprise of a SMTP gateway, a SIP gateway, an H.323 gateway, an ISDN gateway, a PSTN gateway, a softswitch, other industry standard gateway protocols or combinations thereof; and ensuring each user in the at least one group of users is contacted on the first group of user contact devices before each user in the at least one group of users is contacted on the second group of user contact devices.

2. The method of claim 1, wherein the at least one message comprises predefined messages selected from the group consisting of: "power lines are down", "there is a brown out", "you didn't pay your bill", "wash your clothes after 10:00 pm", or combinations thereof.

3. The method of claim 1, wherein the utility is gas, water, electricity, telephone, or combinations thereof.

4. The method of claim 1, wherein the at least one group of users has a group identification.

5. The method of claim 1, wherein the at least one group of users is represented as a list.

6. The method of claim 1, further comprising the step of receiving a user message with updated real time digital user data from each user contact device by the application programming interface and updating the real time digital user data in the dynamic information database using the user message.

7. The method of claim 1, further comprising using the application programming interface to form new groups of users using the user contact device information and instruction from the utility.

8. The method of claim 1, wherein the at least one message from the utility comprises activation of an audio alarm, a visual alarm, or combinations thereof.

9. The method of claim 1, further comprising the step of removing duplicate user contact devices from the user contact device information.

10. The method of claim 1, further comprising using a designated ring tone for each at least one message.

11. The method of claim 1, wherein the application programming interface controls an administrator interface and provides additional code to the administrator interface for creating and transmitting messages to the user contact devices.

12. The method of claim 11, further comprising the step of controlling the administrator interface to only transmit the at least one message within a predefined time interval, wherein the administrator interface comprises a manual override to suppress the predefined time interval to allow the at least one message to be sent at any time.

13. The method of claim 1, further comprising the step of transmitting a survey to at least one of the user contact devices for requesting additional information.

14. The method of claim 13, further comprising the step of receiving a response to the survey and storing the response in the dynamic information database.

15. The method of claim 1, further comprising generating in the dynamic information database a searchable list of the last message sent to at least one of the user contact devices.

16. The method of claim 1, wherein the dynamic information database is encrypted.

17. The method of claim 16, wherein the encrypted dynamic information database has at least one encryption key.

18. The method of claim 1, wherein the application programming interface for communicating the at least one message is a local area network web interface, a wide area network web interface, a virtual private network interface, an asynchronous transfer mode interface, a synchronous optical network interface, a call center interface, a voice mail interface, a satellite interface, a wireless interface, or combinations thereof.

19. The method of claim 1, wherein the user contact devices are handheld wireless devices, wireless phones, land phones, e-mail addresses, fax machines, pagers, digital displays, LED displays, webpages, a TTY/TDD devices, instant messaging devices, or combinations thereof.

* * * * *